3,456,663
COMBINED WALKING CANE AND SHOVEL
Howard F. Blum, 2900 NE. 33rd Ave.,
Fort Lauderdale, Fla. 33308
Filed June 20, 1967, Ser. No. 647,384
Int. Cl. A45b 3/00; A01b 1/02
U.S. Cl. 135—47                                                    1 Claim

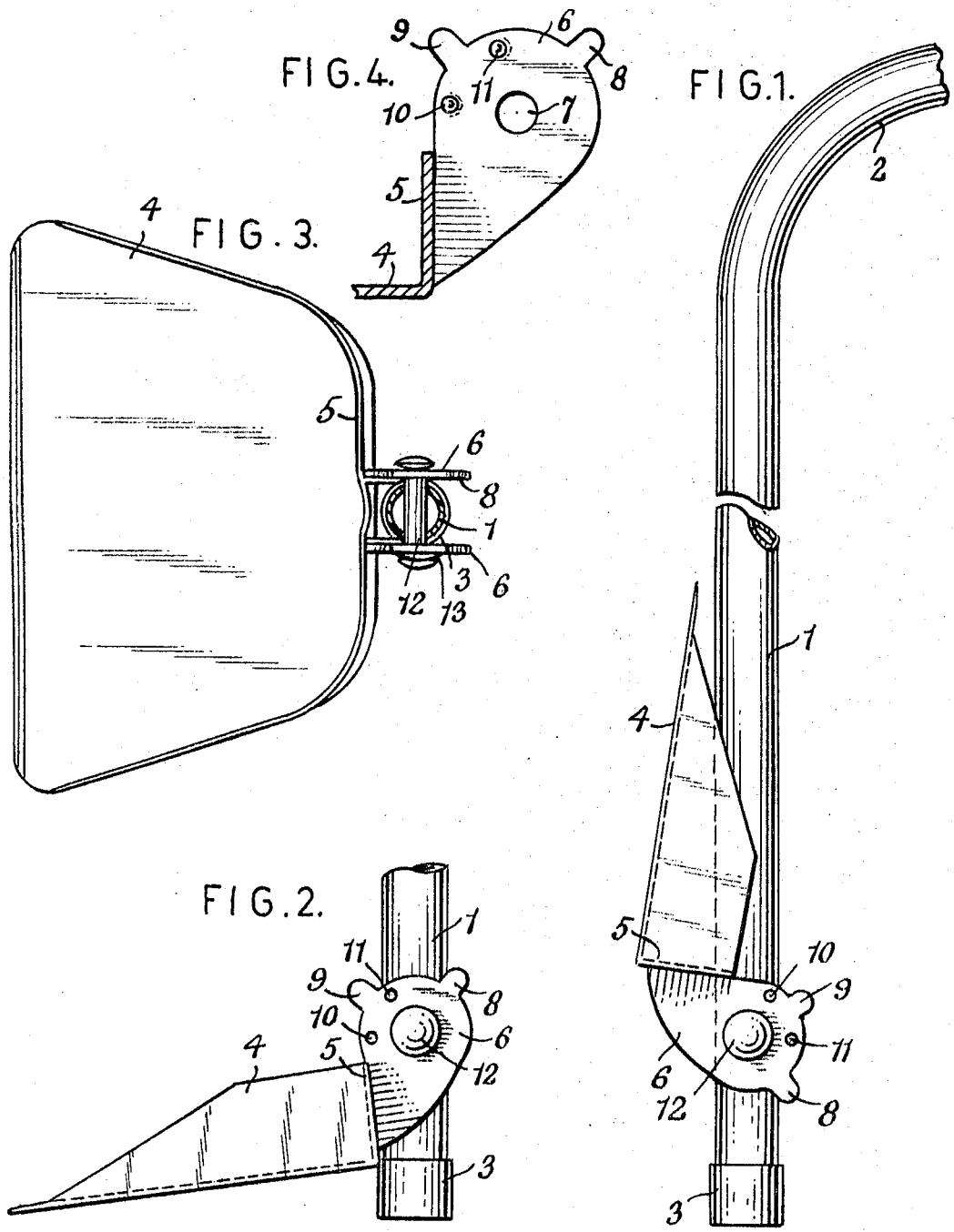

ABSTRACT OF THE DISCLOSURE

This device consists in a so-called "walking stick" or cane provided at its lower end with a hinged shovel or scoop of relatively small size and by which refuse, excrement of animals or pets such as dogs, waste papers or the like, can be readily picked up and carried to suitable locations of disposal. The shovel or scoop is pivotally mounted on the cane adjacent to the lower end of the same and is provided with means for maintaining it in either an operative or inoperative position and with means by which it can, by foot operations, be moved to either of said positions.

---

The invention relates to a useful implement in which the uses and advantages of a walking cane are combined with a shovel or pick-up scoop. Those who require the assistance of a cane in walking often find it necessary or desirable to do a clean-up job occasionally, such as picking up dust, paper scraps or even the excrement of pets, and therefore a means by which the cane can be implemented to enable such jobs to be performed is desirable. The present invention therefore provides an implement having the combined functions of a cane and a pick-up shovel or scoop. In addition, the implement can, in an emergency should the occasion arise, in the case of an attack by unleased dogs or thugs, serve as a protective blade or weapon by which such an attack might well be successfully repelled.

With these and other objects to be hereinafter set forth in view, I have devised the arrangement to be described and more particularly pointed out in the claims appended hereto.

In the accompanying drawings, wherein an illustrative embodiment of the invention is disclosed, FIG. 1 is an elevational view of a cane and shovel constructed according to the invention and with the shovel arranged in its raised or inoperative position;

FIG. 2 shows the shovel in its lowered or operative position;

FIG. 3 is a top plan view of the shovel, with the shank of the cane shown in section, and FIG. 4 shows one of the wings or rear extensions on the shovel.

Referring to the drawing, 1 generally indicates the body of the cane which can be of conventional walking stick shape, having a tubular body or shank provided at the upper end with a crooked portion 2 constituting the known type of handle. The lower end of the cane is provided with a closure cap or ferrule 3.

The cane is thus a hollow tube and can be for lightness, composed of lightweight metal such as aluminum, if desired.

The shovel or scoop is indicated at 4 and may be made in the particular form illustrated or in any other suitable shape. It is provided with a rear wall 5 from which extend a pair of projecting parallel wings or plates indicated at 6. These plates have an aperture 7 through which a headed pivot pin 12 passes, said pin extending through a transverse hole through the cane near its lower end. One or more spring washers 13 may be provided behind the heads of the pivot pin thereby frictionally resisting the pivotal movement of the shovel from the raised position of FIG. 1 to the lowered or operative position shown in FIG. 2.

Each of the wings or plates 6 is provided with a pair of radially projecting ears or lugs 8 and 9 extending from its periphery. When the shovel is in the lowered operative position of FIG. 2 the pressure on the lugs designated at 8, by the foot, will elevate the shovel to the raised position shown in FIG. 1. When it is desired to lower the shovel to the operative position of FIG. 2, upward pressure of the foot under the rearwardly projecting lugs 8 or 9 will cause the required lowering movement of the shovel.

Each of the wings or plates 6 is formed with inwardly-distorted detents 10 and 11 so positioned that the same engage the cane in the raised and lowered position of the shovel, thus holding the shovel in either of these positions until the shovel is forced by pressure on the lugs to cause the detents to pass the cane body to move to the required position.

When the shovel is in its raised position, the lower end of the cane projects below the shovel as seen in FIG. 1 so that the cane may be freely used as a normal aid to walking and when the shovel is extended or lowered its function as a pick-up device will be apparent, and the device can, of course be manipulated without bending or stooping.

I claim:

1. A cane or walking stick having a body provided with a handle at the top, a shovel or scoop pivotally mounted near to and spaced above the lower end of the cane body and having projections by means of which the shovel or scoop can be pivotally moved by foot pressure imposed on one or the other of the projections, to a projecting pick-up position or to a raised vertical position in which latter position the shovel or scoop extends longitudinally of the body of the cane and with the bottom of the shovel disposed substantially parallel to the longitudinal axis of the body of the cane, the pivot for the shovel being so located that when the shovel is in a raised position it will be located upwardly from the lower end of the cane body and will lie in close proximity to the cane body and said lower end of the cane body will then project beyond the shovel for ground contact, the body of the cane having a transverse aperture extending through it near to but spaced above its lower end, the shovel being provided with rearwardly extending wings straddling the body of the cane, the shovel being pivoted to the cane body by a pivot pin passing through the wings and through the aperture in the cane body, detent means on the wings for engagement with the body of the cane to maintain the shovel in either a raised vertical position or in the lowered operative position, and the projections consisting of a pair of spaced projections on each of the wings, which projections extend radially outwardly from the wings and are so located as to permit the foot pressure against them required to cause the pivotal lowering and raising movements of the shovel.

References Cited

UNITED STATES PATENTS

| | | | |
|---|---|---|---|
| 2,603,781 | 7/1952 | Ruskin | 227—28 |
| 3,374,022 | 3/1968 | Tagg | 294—2 |
| 1,271,287 | 7/1918 | Daly | 294—55 |
| 1,478,204 | 12/1923 | Cooney et al. | 294—51 X |

EVON C. BLUNK, Primary Examiner

D. WATTS, Assistant Examiner

U.S. Cl. X.R.

294—53.5